United States Patent [19]

Kain

[11] Patent Number: 5,672,880

[45] Date of Patent: Sep. 30, 1997

[54] FLUORESECENCE IMAGING SYSTEM

[75] Inventor: Robert C. Kain, San Jose, Calif.

[73] Assignee: Molecular Dynamics, Inc., Sunnyvale, Calif.

[21] Appl. No.: 616,174

[22] Filed: Mar. 15, 1996

Related U.S. Application Data

[63] Continuation-in-part of Ser. No. 351,603, Dec. 8, 1994, abandoned.

[51] Int. Cl.$^6$ .................................................. G01N 21/64
[52] U.S. Cl. .................................................. 250/458.1
[58] Field of Search ........................................ 250/458.1

[56] References Cited

U.S. PATENT DOCUMENTS

| | | | |
|---|---|---|---|
| 4,284,897 | 8/1981 | Sawamura et al. | |
| 4,877,965 | 10/1989 | Dandliker et al. | 250/458.1 |
| 5,022,757 | 6/1991 | Modell | 356/318 |
| 5,192,980 | 3/1993 | Dixon et al. | 356/326 |
| 5,381,224 | 1/1995 | Dixon et al. | 356/72 |
| 5,504,336 | 4/1996 | Noguchi | 250/458.1 |

OTHER PUBLICATIONS

Richard L. Shoemaker et al., "An Ultrafast Laser Scanner Microscope for Digital Image Analysis", *IEEE Transactions on Biomedical Engineering*, vol. BME-29, No. 2, pp. 82-91, (Feb. 1982).

*Primary Examiner*—Constantine Hannaher
*Attorney, Agent, or Firm*—Thomas Schneck; Kenneth C. Brooks

[57] ABSTRACT

A fluorescence imaging system that includes an objective that is both achromatic and has an external entrance pupil. The objective also serves as a condenser for the system which substantially reduces the system's cost and footprint. With the objective positioned above a sample so that they are in close proximity to one another, a laser directs a collimated beam of light to a scan device located at the objective entrance pupil. The scan device reflects, refracts, or diffracts the light through the lens to illuminate a spot on the sample's surface. The scan device illuminates a line or an area on the sample surface by varying the angle of laser light, in one or two dimensions, into the objective. The sample emits fluorescent light in response to the illumination. The fluorescence light is collected by the objective and passes through the system along the path of the illumination light. A wavelength-discriminating dichroic filter is placed along the optical axis between the laser and the objective to direct the fluorescent light onto a photo-detector to produce a signal representing the sample surface emitting the fluorescent light. A display device is provided that displays the digitized data in a raster format.

30 Claims, 3 Drawing Sheets

FLUORESECENCE IMAGING SYSTEM

CROSS-REFERENCE TO RELATED APPLICATION

This is a continuation-in-part of patent application Ser. No. 08/351,603, filed on Dec. 8, 1994, now abandoned.

TECHNICAL FIELD

The present invention relates to laser scanning imaging systems, particularly for use in fluorescence imaging.

BACKGROUND ART

Fluorescence microscopy is often used in the fields of molecular biology, biochemistry and other life sciences. One such use is in identifying a specific antigen using antibodies. Antibodies are proteins produced by vertebrates as a defense against infection. They are made of millions of different forms, each having a different binding site and specifically recognizing the antigen that induces its production. To identify an antigen, a sample of cells is provided that contains specific antibodies coupled to a fluorescent dye. The cells are then assessed for their fluorescence. Taking advantage of the precise antigen specificity of antibodies, the cells having fluorescent properties are known to contain a specific antigen.

Originally, the fluorescence of cells was assessed manually by visual inspection, using conventional microscopy. This proved time-consuming and costly. The need for high-speed automated systems became manifest. Many high-speed imaging systems, such as confocal microscopes, are available for assaying cell samples. The illumination and collection optics, along with their relative geometry, determine in large part the parameters of the other system elements.

A prior art high-speed imaging system is shown in FIG. 1 and includes an F-Θ objective 10 positioned above a sample 11 so that the surfaces of the objective are perpendicular to the sample's normal. A laser light source 12 produces a beam 13. The objective 10 directs the beam 13 to illuminate a spot on the sample's surface. An oscillating reflective surface 14 is disposed at the pupil 15 of the system, between the light source 12 and the objective 10, to deflect the beam 13 back and forth along one axis. The sample is placed on a table to move the sample in a direction perpendicular to the first scan direction, thereby resulting in a two dimensional scan pattern on the sample's surface. The objective is not designed for coaxial collection resulting in light reflected from the sample surface being collected by a condenser assembly 16 that is separate and apart from the objective. Such a geometry results in increased system footprint, increased optical complexity and a limitation of solid angle collection. The collected light is then imaged on a photo-detector 17. The design of a classical F-Θ lens is primarily for monochromatic illumination. As a result, such lenses lack good polychromatic performance. Therefore, the objective 10 manifests lateral and axial chromatic aberrations over a broad band of wave-lengths.

A prior art high-speed imaging system, similar to that described with respect to FIG. 1, is disclosed by Richard L. Shoemaker et al., in "An Ultrafast Laser Scanner Microscope for Digital Imaging Analysis", IEEE *Transactions on Biomedical Engineering*, Vol. BME-29, No. 2, Feb. 1982, pp. 82–91. The principal difference between these two systems concerns the scanning device. Instead of a galvanometric scanner, Shoemaker et al. require the use of a rotating polygon mirror to scan the spot over the sample's surface.

Another prior art high-speed imaging system is disclosed in U.S. Pat. No. 4,284,897 by Sawamura et al., in which laser light is reflected through two galvanometric mirrors and one dichroic mirror to direct a beam through an objective and illuminate a spot on a sample's surface. The galvanometric mirrors are swung in appropriate directions to allow the spot to scan over the entire surface of the sample. In response to the illuminating spot, the sample emits fluorescence light. The objective, serving as a condenser lens, transmits the light back through a first dichroic mirror. Positioned behind the first dichroic mirror is a second dichroic mirror that splits the fluorescent light into a light produced by a first probe at a first wavelength and light produced by a second probe at a second wavelength. The first and second wavelengths are transmitted to respective photo-detectors.

U.S. Pat. No. 5,296,700 to Kumagai discloses a fluorescent confocal microscope which includes, in pertinent part, an intermediary optical system disposed between a pair of scan mirrors and an objective optical system. The intermediary optical system is designed to cancel chromatic aberrations of magnification introduced by the objective optical system.

U.S. Pat. No. 5,260,578 to Bliton et al. discloses a scanning confocal microscope which includes, in pertinent part, two beam sources. One beam source produces ultra violet light. One beam source produces visible light. An optical assembly is included in the common optical train to correct chromatically induced scanning errors.

U.S. Pat. No. 5,381,224 by Dixon et al. discloses a scanning laser imaging system which allows simultaneous confocal and non-confocal imaging of reflected light from macro-size samples. The system includes, in pertinent part, a laser producing a beam which traverses a beam expander and impinges upon a single mirror disposed in an optical axis, which is defined by an F-Θ lens. The F-Θ lens directs the beam onto a sample, which is disposed upon a moveable stage. The mirror scans the beam along a first direction, and the stage moves the sample along a second direction, transverse to the first direction. In this manner, the beam scans across the sample in two directions. Disposed between the F-Θ lens and the sample is a beam splitter designed to collect light emitted from the sample. The beam splitter directs a portion of light emitted from the sample onto a condenser lens, which in turn directs it onto a non-confocal detector. A condenser lens is required for efficient detection. A portion of the light passing through the beam splitter is directed along the same path as a beam by the F-Θ lens, forming a retrobeam. The F-Θ lens allows confocal imaging at the expense of collection efficiency, necessitating the use of the condenser to increase the numerical aperture of the collection system. The retro-beam impinges upon a second beam splitter, positioned between the scan mirror and the laser. The second beam splitter directs the light onto a focusing lens. The focusing lens is positioned proximate to a field stop, having an aperture. The aperture is confocal to the light emitted from the sample and selectively restricts light in the retro-beam from reaching the detector. Light traversing the aperture impinges upon a confocal detector. The fluorescent light collected through the F-Θ lens is not corrected for axial or lateral color aberrations.

A disadvantage of the prior art systems is that in addition to the illumination optics, additional optics are required either to scan the beam on a sample or to efficiently collect light emitted from a macro size sample, thereby increasing the systems' cost and size.

It is an object, therefore, of the present invention to provide a high-speed, low cost, high collection efficiency, high resolution, including lateral and axial color correction, laser scanning system that will provide point by point fluorescent imaging of a sample on a micro or macro scale.

It is a further object of the present invention to provide a fluorescence imaging system of a substantially smaller size than the prior art systems that affords a larger scan field than existing coaxial illumination and collection systems.

SUMMARY OF THE INVENTION

These objectives have been achieved by positioning a telecentric lens, that has an external pupil and is both laterally and axially achromatic, above a sample so that they are both in close proximity with one another. The lens forms the objective of the system. The objective is defined as the system's lens that is closest to the sample and which has as its front focus, the sample. A laser produces a collimated beam of coherent light that is directed through the objective to illuminate a spot on the sample's surface, thereby stimulating a small region of the sample to emit fluorescent light. The spot usually has a diameter close to the limit defined by the laws of diffraction. The objective also serves as a condenser and collects the fluorescent light emitted by the sample. The objective directs the collected light back along the identical path traveled by the incident beam, but in the opposite direction. A wavelength-discriminating dichroic filter is placed along the optical axis between the laser and the objective to separate the fluorescent light from the incident beam and direct the fluorescent light onto a photodetector to produce a signal representing the sample surface emitting the fluorescent light. To obtain a full field view of the sample, a two dimensional scanning device, with a reflecting element having a scan center positioned at the pupil of the system, scans the spot over the entire surface of the sample. A display device is provided and synchronized with the scanning device to reproduce an image of the sample.

BEST MODE FOR CARRYING OUT THE INVENTION

Figure 2:
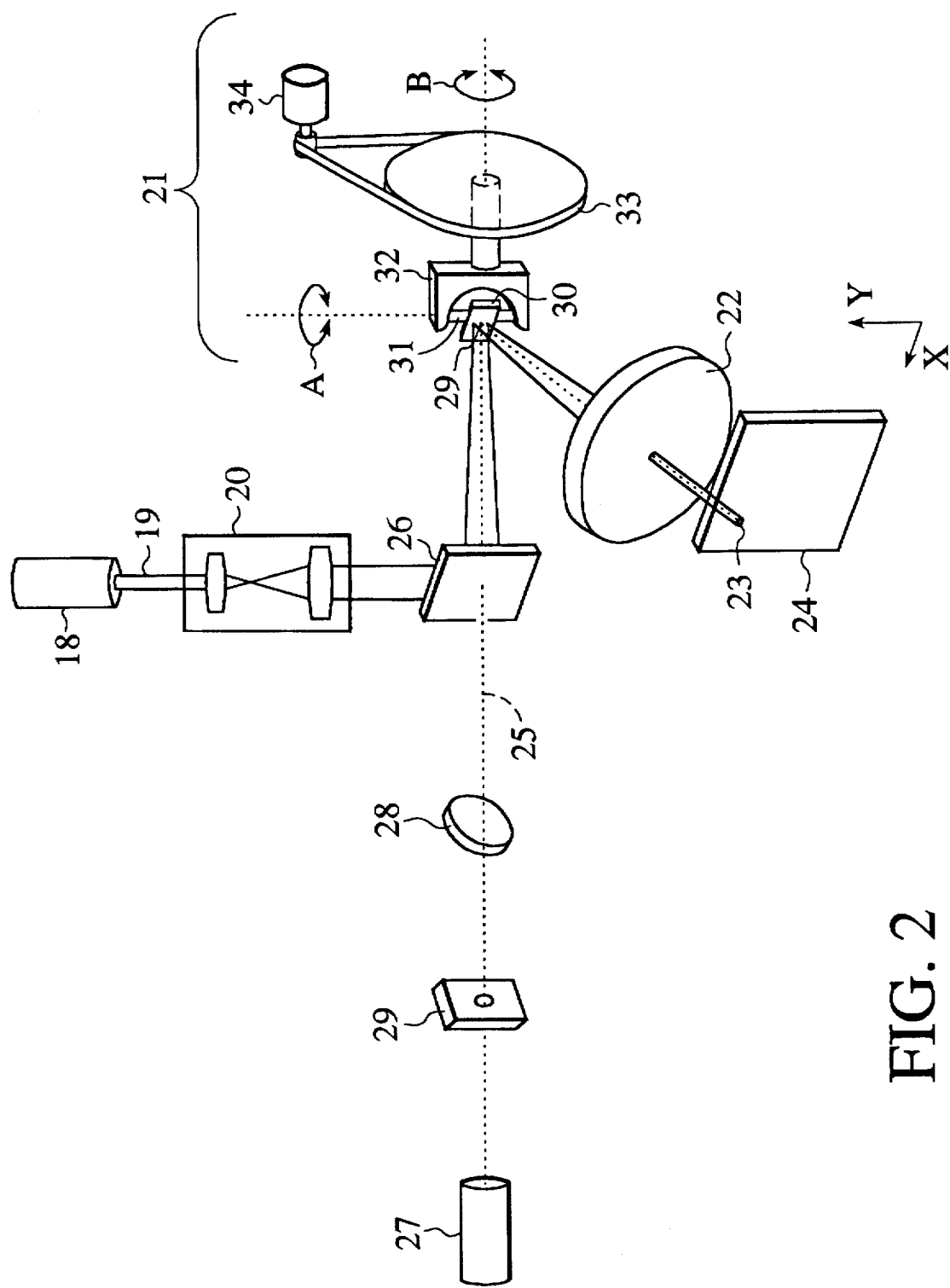
FIG. 2 is a perspective view of optical components of the present invention.

FIG. 2 shows a laser 18 producing an excitation/incident beam 19, which is directed through a beam expander 20. It is preferred that the laser produce a collimated beam of coherent light. However, it is possible to use a non-coherent light source optically coupled to collimating optics to create an incident light beam, e.g., a light emitting diode. If a non-coherent light source, such as an LED, is employed, a pinhole and a collimating lens would be disposed in front of the LED to create a collimated excitation/incident beam capable of being focused to a small spot.

After exiting beam expander 20, beam 19 is reflected on a two dimensional scanning device 21 and directed through an achromatic objective 22, which also serves as a condenser. One advantage of having collimated light entering the objective is that it renders the system less sensitive to changing objectives. Objective 22 directs beam 19 to illuminate a region 23 of a sample 24, thereby stimulating the sample to emit light. Region 23 may be a spot, multiple spot or a line extending across sample 24. Further, the line may be either linear or arcuate and may extend either completely across or partially across sample 23. Typically, the light emitted by region 23 is fluorescent, which is collected by objective 22 and directed, as a retro-beam 25, back along an identical path of incident beam 19, but in an opposite direction. A beamsplitter 26 separates retro-beam 25 from incident beam 19 and images retro-beam 25 onto a detector 27. Beamsplitter 26 could be employed so that it transmits incident beam 19 and reflects retro-beam 25. Alternatively, incident beam 19 could be reflected and retro-beam 25 transmitted, which is the preferred embodiment shown in FIG. 2. It is to be understood that any type of beamsplitter may be employed, so long as it is capable of separating incident beam 19 from retro-beam 25. For example, a dichroic filter, a fresnel reflector, a prism, a grating or a 50% beamsplitter may be employed. In addition, a polarization sensitive beamsplitter may be used to achieve the separation. This embodiment could include a ¼ waveplate positioned between the beamsplitter and the objective. This would cause incident beam 19 exiting the ¼ waveplate to be circularly polarized. Also, additional focusing optics 28 and a back aperture 29 may be present to further shape the retro-beam 25 as desired. Sample 24 may be illuminated point by point by scanning a spot in a raster scan fashion over the entire surface of the sample 24, to obtain a full-field image of it. Alternatively, sample 24 may be illuminated with a line scan.

Figure 1:
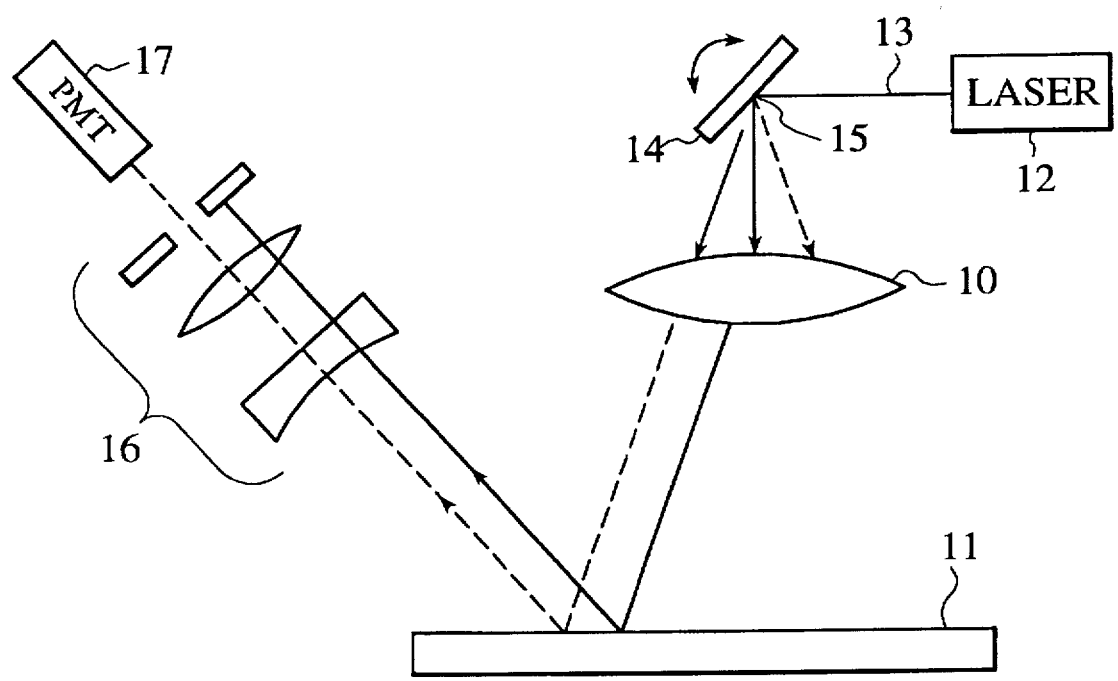
FIG. 1 is a simplified side view of a laser scanning microscope of the prior art.
Figure 3:
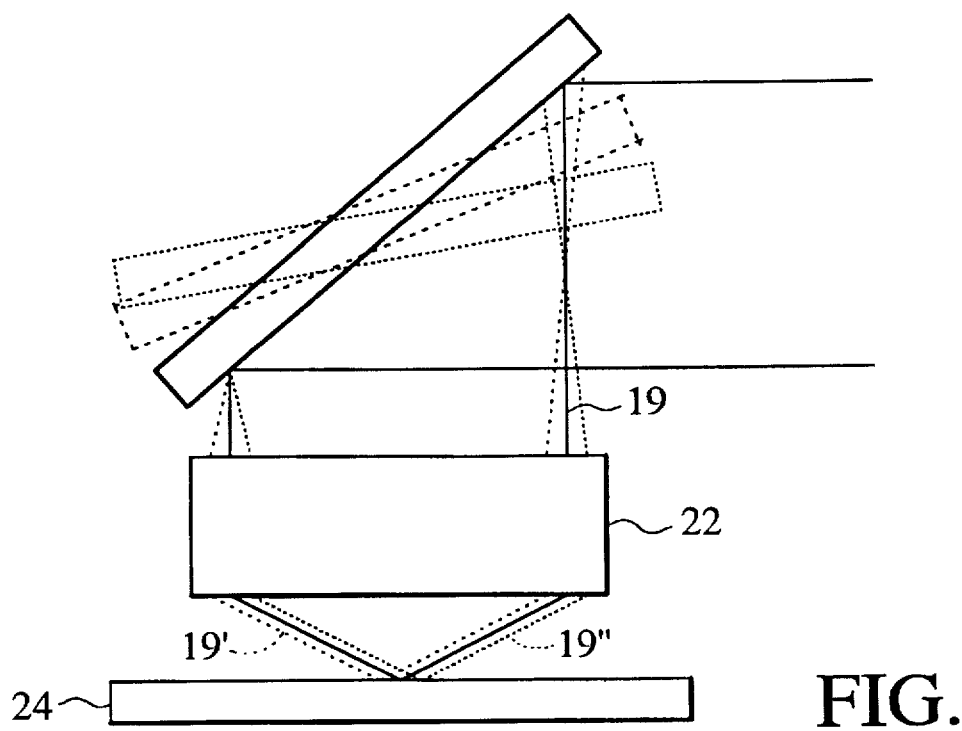
FIG. 3 is a detailed view of a scanning beam passing through the objective shown in FIG. 2.

Referring to FIG. 3, objective 22 affords coaxial illumination and collection. With respect to incident beam 19, objective 22 is afocal in the image plane. It is preferred that objective 22 is telecentric. The telecentricity of objective 22 results in sample 24's surface always lying at a right angle with respect to the chief ray of incident beam 19, exiting objective 22. With respect to incident beam 19, the objective plane is proximate to sample 24, forming an airspace therebetween which is devoid of optical elements. Beam 19 is shown entering objective 22 at three different positions, with the chief ray of incident beam 19 having a different angle of incidence at each position. Regardless of incident beam 19's angle of incidence on objective 22, the chief ray of incident beam 19 exiting objective 22 is orthogonal to sample 24's surface. One advantage of having this telecentric objective is that it renders the system magnification relatively insensitive to errors in focus position. In addition, the achromaticity of objective 22 allows it to operate over a broad band of wavelengths of light, e.g., the primary wavelength plus approximately 200 nm, or greater, while maintaining axial and lateral aberrations below the effective resolution of the system. This allows objective 22 to operate with lasers of various wavelengths and to collect light from a wide variety of fluorochromes.

The specifications of two implementations of objective 22 are as follows:

|  | Lens 1 | Lens 2 |
| --- | --- | --- |
| Scan Area (diagonal) | 1 mm | 1 cm |
| Resolution | 0.6 μm | 10 μm |
| Numerical Aperture | 0.75 | 0.25 |
| Intensity Uniformity | 95% | 95% |
| Spatial Uniformity | 98% | 98% |

|  | Lens 1 | Lens 2 |
| --- | --- | --- |
| Polychromatic Range | 500—750 nm | 500—750 nm |
| Thru focus sensitivity | 1% (signal change over 20 μm) | 1% (signal change over 100 μm) |
| Field Flatness Variation | +/−10 μm | +/−20 μm |
| Working Distance | 3 mm | 3.5 mm |

It is important to note that the specifications listed above are merely exemplary of the lenses used in the present invention. The parameters may be varied as needed to adapt a system to a particular operation. For example, lens 1 is directed to micro-imaging, which provides a small field of view, compared to lens 2. The small field of view provided by lens 1 affords higher resolution, but increases the time necessary to scan large sample areas. Lens 2, on the other hand, is directed to macro-imaging. To that end, lens 2 provides a relatively large field of view, compared to lens 1. Although the resolution of lens 2 is less than lens 1, there are advantages provided by an objective lens with large fields of view. These lenses are useful for scanning large arrays of samples, e.g., planar field arrays containing up to a million specimens. The time necessary to scan these large arrays is substantially reduced by employing an objective with a large field of view.

Various techniques may be employed to provide both micro and macro imaging. One method by which to change between micro and macro imaging is to physically interchange the objective lenses having different parameters. In addition, an objective could be constructed as a zoom lens, providing fields of view of varying sizes. The zoom objective may be designed to operate in a discrete mode, affording selection of fields of view of predetermined size. Alternatively, the zoom objective may be designed to operate in a continuous mode, affording a range of sizes of field of view.

Referring again to FIG. 2, an important feature of objective 22 is that it defines an external pupil 29 of the system, which is positioned at the scan center. Any scanning mechanism that provides a two dimensional scan may be used, e.g., a rotating polygonal mirror, rotating holographic scanner, or oscillating prisms. Also, an acousto-optic deflector or a penta-prism scanning deflector may be employed. The preferred embodiment, however, is to employ a scanning system having one beam reflecting element 30 in the path of the incident beam which is pivotable about two perpendicular axes. The reflecting element may be a planar, convex, concave or polygonal mirror. A rotating penta-prism may also be used. Reflecting element 30 is not essential, however, as a refractive or diffractive deflecting elements may also be used in lieu thereof. Reflective element 30 is supported on spindles 31 by a forked bracket 32 and, therefore, pivotable about axis A. Reflective element 30 may be moved by any means known in the art, but is typically a galvanometer mirror. The bracket 32 is attached at one end to wheel 33 that is driven by a stepper motor 34. The motor 34 drives the wheel 33 to pivot reflective element 30 about axis B.

Figure 4:
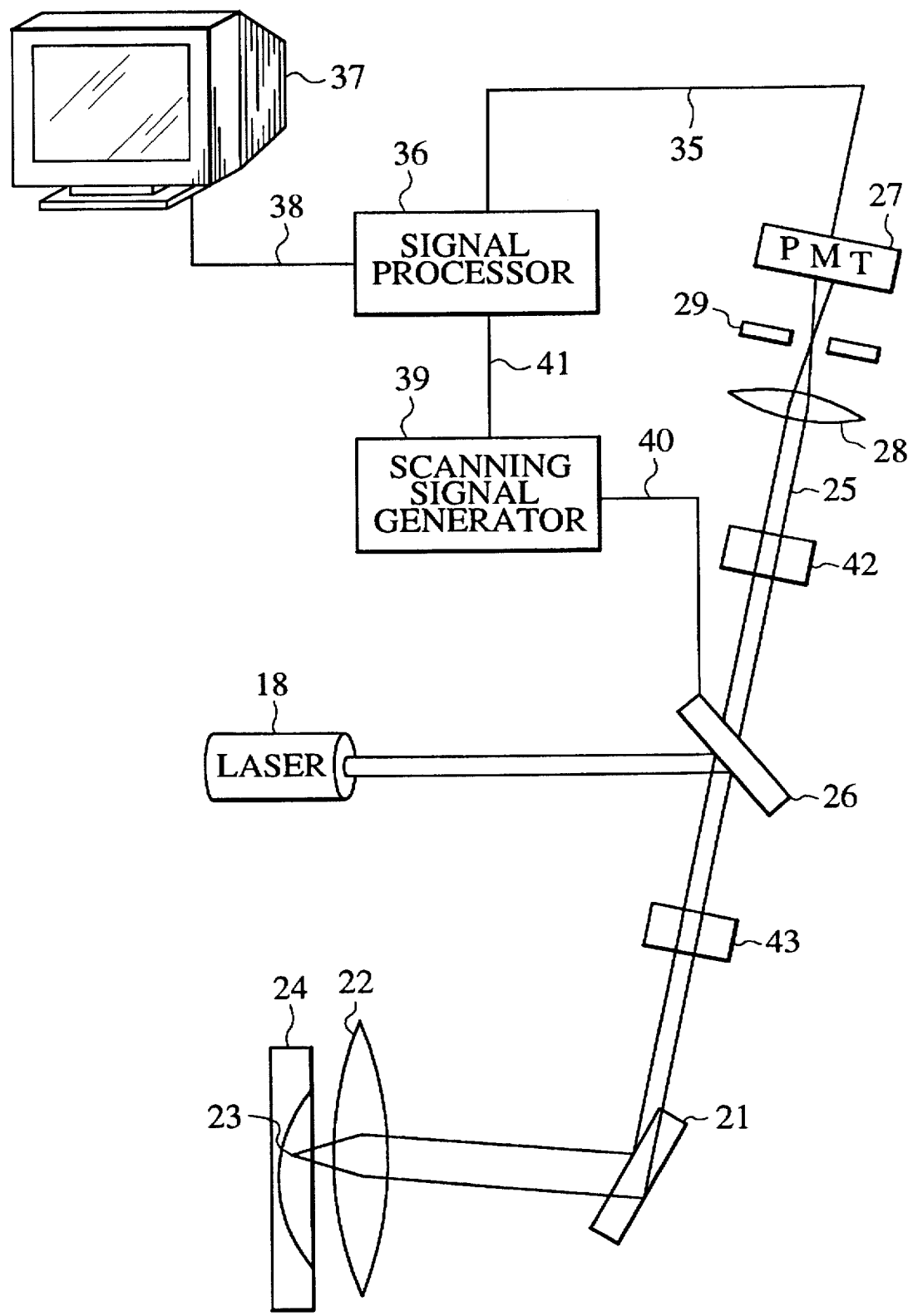
FIG. 4 is a simplified side view of the optical components shown on FIG. 2 including a video display system to reproduce an image of the sample in accordance with the present invention.

Referring to FIG. 4, the preferred embodiment is shown with retro-beam 25 formed from fluorescent light emanating from sample 24. A wavelength selective filter 42 may be placed in the path of retro-beam 25 between beamsplitter 26 and back aperture 29 to prevent unwanted light from impinging upon detector 27. Filter 42 would typically reject, or attenuate, light emitted by laser 18, while allowing light associated with retro-beam 25 to pass therethrough. Retro-beam 25 is imaged on a light detector 27. Although any light detector may be used, it is preferred to use a photomultiplier tube. However, if beam 19 impinges upon region 23 as a line, then a linear array of photosensitive devices, such as a CCD array, would be employed in lieu of a photomultiplier tube. To obtain a line scan, a holographic lens, a cylindrical lens, a binary optic or any other suitable optical element 43 could be disposed in the path of incident beam 19, between objective 22 and laser 18.

Referring also to FIG. 2, the signal from detector 27 passes through electrical connections 35 to a signal processor 36 of a video display system including a video display screen 37. The signal from detector 27 modulates the intensity of the image signal transmitted from the processor 36 through the output line 38 to the display screen 37. A scanning signal generator 39 supplies electrical signals to the scanning apparatus 22 through electrical connections 40. Scanning apparatus 22 moves in response to generator 39's signals. The signal from detector 27 is digitized and stored in memory and can be simultaneously scanned onto a display.

Preferably, the system takes advantage of detection using the conjugate focal (confocal) technique. In this manner, retro-beam 25 emanates from region 23, which corresponds to a point source of light illuminated by beam 19, with beam 19 focused to a diffraction limited spot on sample 24. Retro-beam 25 is imaged on detector 27 after passing through back aperture 29. Back aperture 29 isolates the detection of the system to that substantially coincident with region 23 so that back aperture 29 and region 23 are optically conjugated with each other. Although fluorescent confocal imaging is the preferred embodiment, the system may be used in a non-confocal manner. In this fashion, back aperture 29 may filter light in retro-beam 25 in either a non-confocal or semi-confocal manner. In either manner, back aperture 29 improves the signal-to-noise ratio.

An obvious extension of the invention is in the area of reflection imaging. That is, the reflected laser beam could be collected at the detector instead of the fluorescent beam. Both the reflected beam and the fluorescent beam could be read at the detectors if a second dichroic beamsplitter was positioned after the primary dichroic beamsplitter. Or in a like manner, multiple fluorescent labels could be detected by using multiple secondary beamsplitters and detectors.

Finally, in lieu of laser 18, a non-coherent source of light may be employed that has an extended emission area greater than the field size of objective 22. In this embodiment, no pin hole would be disposed in the path of light emitted by the non-coherent source. This allows the complete field of view of objective 22 to be filled with non-coherent light. Scanning mechanism 21 would remain stationary. Focusing optics 28 would define a pupil coinciding with the entrance pupil of objective 22. Detector 27 would comprise of an array of photosensitive devices having an area equal to the field size of objective 22, multiplied by the ratio of optics 28's focal length to objective 22's focal length. In this fashion, the area of sample 24 simultaneously imaged onto detector 27 would be equal in size to the field size of objective 22.

I claim:

1. An optical scanning system for microscopy of a sample comprising, a photodetector, a source for emitting an incident beam of light, a telecentric objective disposed proximate to said sample, defining an optical axis, a high numerical aperture and a single pupil, with said single pupil located external to said objective in said optical axis, said objective being positioned to receive said incident beam therethrough to illuminate a region of said sample, said objective being afocal at said pupil and adapted to collect light emitted from said region forming a retro-beam, means, positioned at said pupil, for scanning said region across said sample, with substantially all light associated with said retro-beam impinging upon said scanning means, means, positioned in said optical axis between said source and said objective, for separating said incident beam from said retro-beam, wherein said objective directs said retro-beam onto said separating means, with said separating means directing said retro-beam toward said photo-detector, said photo-detector producing signals representing light impinging thereon, and means, connected to receive said signals, for producing a visual display of said sample.

2. The optical system of claim 1 further including a wavelength selective filter disposed between said photodetector and said separating means to transmit light having a predetermined wavelength while attenuating all other light.

3. The optical scanning system of claim 1 wherein said objective is achromatic.

4. The optical scanning system of claim 1 wherein said objective has first and second ends, with said first end facing said scanning means and spaced apart therefrom a first distance, with said second end opposing said first end and positioned proximate to said sample, defining a working distance therebetween, with said working distance being substantially less than said first distance.

5. The optical system of claim 1 further including a back aperture positioned between said separating means and said photodetector, and focusing optics, positioned between said back aperture and said separating means in the path of said retro-beam, with said back aperture adapted to be optically conjugate to said region.

6. The optical scanning system of claim 1 further including means, positioned between said beam source and said separating means, for changing the diameter of said incident beam.

7. The optical scanning system of claim 1 wherein said beam source is a non-coherent source of light optically coupled to collimating optics.

8. The optical scanning system of claim 1 wherein said separating means is a mirror having a diameter greater than the diameter of said incident beam and smaller than the diameter of said retro-beam, with the diameter of the retro-beam being substantially larger than the diameter of the incident beam.

9. The optical scanning system of claim 1 wherein said separating means is a dichroic filter.

10. The optical scanning system of claim 1 wherein said separating means is a prism.

11. The optical scanning system of claim 1 wherein said separating means is a grating.

12. The optical scanning system of claim 1 wherein said separating means is a fresnel reflector.

13. The optical scanning system of claim 1 wherein said scanning means includes a reflective surface.

14. The optical scanning system of claim 1 wherein said scanning means includes a refractive scanning deflector.

15. The optical scanning system of claim 1 wherein said scanning means includes a diffractive scanning deflector.

16. The optical scanning system of claim 1 further including means, disposed in the path of said incident beam between said source and said separating means, for illuminating said region as a line.

17. The optical scanning system of claim 16 wherein said illuminating means is a binary optic.

18. The optical scanning system of claim 16 wherein said illuminating means is a holographic lens.

19. The optical scanning system of claim 16 wherein said illuminating means is a cylindrical lens.

20. The optical scanning system of claim 1 wherein said retro-beam comprises fluorescent light.

21. The optical scanning system of claim 1 wherein said retro-beam comprises specularly reflected light.

22. The optical scanning system of claim 1 wherein said retro-beam comprises dispersive light emitted from said region.

23. An optical scanning system for fluorescence microscopy of a sample, said system comprising, a photodetector, a beam source for emitting a collimated beam of coherent light, a telecentric objective lens means for directing said collimated beam onto said sample, forming an illuminated region thereon, and collecting light emitted from said region, forming a fluorescent retro-beam, said objective lens means defining a single pupil, a high numerical aperture and a working distance, with said pupil located external to said objective lens means, said objective lens means being afocal at said pupil, said working distance measured between said sample and said objective lens means, with said objective lens means adapted to provide different numerical apertures with said numerical apertures being inversely proportional to said working distance so as to maintain said objective lens means proximate to said sample, means, in said optical axis, for scanning said region across said sample, said scanning means including a reflective element positioned at said pupil or said objective lens means, means, positioned in said optical axis between said beam source and said objective lens means, for separating said incident beam from said retro-beam, wherein said objective lens means directs said retro-beam onto said separating means, with said separating means directing said retro-beam toward said photo-detector, said photo-detector producing signals representing light impinging thereon, and means, connected to receive said signals, for producing a visual display or said sample.

24. The optical scanning system of claim 23 wherein said separating means is a mirror having a diameter greater than a diameter of said collimated beam and smaller than a diameter of said retro-beam, with the diameter of the retro-beam being substantially larger than the diameter of the collimated beam.

25. The optical scanning system of claim 23 wherein said objective lens means includes a plurality of objective lenses each of which is adapted to be selectively coupled to said collimated beam.

26. The optical scanning system of claim 23 wherein said objective lens means comprises of a zoom lens.

27. An optical scanning system for fluorescence microscopy of a sample, said system comprising, a beam source for emitting a collimated beam of coherent light, a photo-detector, a telecentric objective defining an optical axis, a high numerical aperture and a single pupil, with said pupil located external to said objective, said objective positioned to receive said collimated beam therethrough to illuminate a spot on the surface of said sample, said objective being achromatic and afocal at said pupil and directing said incident beam onto said surface at a right angle with respect to the surface of said sample, said objective collecting light emitted from said spot, and forming a fluorescent retro-beam, means, in said optical axis, for raster scanning said spot, on said sample, said scanning means including a reflective element positioned at said pupil of said objective, with said telecentric objective adapted to form said retro-beam with a cross-sectional area of sufficient size relative to said reflective element to ensure substantially all light associated with said retro-beam impinges upon said reflective element, a dichroic filter positioned in said optical axis between said beam source and said objective, wherein said objective directs said retro-beam onto said dichroic filter, with said dichroic filter separating said retro-beam from said collimated beam and directing said retro-beam toward said photo-detector, with said photo-detector producing signals representing said substantially all light emitted from said spot, and means, connected to receive said signals, for producing a visual display of said sample.

28. The optical scanning system of claim 27 wherein said objective has first and second ends, with said first end facing said scanning means, and spaced apart therefrom a first distances, with said second end opposing said first end and positioned proximate to said sample, defining a working distance therebetween, said working distance being substantially less than said first distance.

29. The optical scanning system of claim 28 wherein said scanning means further includes means for rotating said reflective element about a pivot axis.

30. The optical scanning system of claim 28 wherein said working distance is in the range between 3 and 3.5 mm inclusive.

* * * * *

UNITED STATES PATENT AND TRADEMARK OFFICE
CERTIFICATE OF CORRECTION

PATENT NO. : 5,672,880
DATED : September 30, 1997
INVENTOR(S) : Robert C. Kain

It is certified that error appears in the above-identified patent and that said Letters Patent is hereby corrected as shown below:

On the title page, under item [54], in the title of the invention, "FLUORESECENCE" should read - - FLUORESCENCE - -.

Column 1, line 1, in the title of the invention, "FLUORESECENCE" should read - - FLUORESCENCE - -.

Claim 23, column 8, line 34, "said pupil or said objective lens" should read - - said pupil of said objective lens - -.

Signed and Sealed this

Seventeenth Day of March, 1998

Attest:

BRUCE LEHMAN

*Attesting Officer*     *Commissioner of Patents and Trademarks*